United States Patent [19]

Inui et al.

[11] Patent Number: 4,988,973
[45] Date of Patent: Jan. 29, 1991

[54] STEERING WHEEL

[75] Inventors: Shuji Inui; Chikahisa Hayashi; Makoto Kanai; Toshinori Takahashi, all of Nishikasugai, Japan

[73] Assignee: Toyoda Gosei Co., Ltd., Nishikasugai, Japan

[21] Appl. No.: 234,147

[22] Filed: Aug. 19, 1988

[30] Foreign Application Priority Data

Aug. 28, 1987 [JP] Japan ................................ 62-216195
Apr. 30, 1988 [JP] Japan ................................ 63-107973

[51] Int. Cl.⁵ ............................................. B60Q 1/00
[52] U.S. Cl. .................................. 340/425.5; 455/602
[58] Field of Search ..................... 340/425.5; 455/602, 455/603; 307/10.1

[56] References Cited

U.S. PATENT DOCUMENTS 4,380,341  4/1983  Waldschutz et al. .
4,383,148  5/1983  Arima et al. .
4,588,895  5/1986  Kürbitz .................. 455/602
4,598,602  7/1986  Kurata et al. .
4,616,224 10/1986  Reighard ............... 455/602
4,772,799  9/1988  Inui et al. .......... 340/825.69

Primary Examiner—Charles A. Ruehl
Assistant Examiner—Brian R. Tumm
Attorney, Agent, or Firm—Cushman, Darby & Cushman

[57] ABSTRACT

The present invention relates to steering wheels of automobiles provided with communication systems employing light transmitters, comprising a steering shaft, a boss plate fixed on the tip of the steering shaft, a ring portion mounted to said boss plate, light emitters and light receivers provided with said boss plate therebetween to perform light communication, the light emitters comprising a plurality of emitting units while the light receivers comprise a plurality of receiving units corresponding to the emitting units of the emitters so as to transmit and receive signals with each other, thereby constituting a communication unit with a pair of emitting and receiving units, and a plurality of through holes formed on the boss plate in correspondence to the light emitting and light receiving units, which are more than the communication units and enable all the light signals of all the units for light communication to pass therethrough.

21 Claims, 9 Drawing Sheets

STEERING WHEEL

BACKGROUND OF THE INVENTION

1. Field of the Invention

The present invention relates to an automobile steering wheel provided with a communication system employing a light transmitting means.

2. Description of the Related Art

Lately, audio sets, drive computers or others have come to be incorporated in automobiles, therefore control switches have come to be disposed on pad portions of steering wheels.

In this case, multiplex communication circuits using light communication means are publicly known as communication systems between pad portions and column portions of steering wheels, wherein light emitting units are disposed on pad portions while light receiving units on column portions.

Such a communication system as this is provided, as shown in FIG. 23, with a switch 30, a transmitting side remote control IC 31, a driver circuit 32 and a power circuit 33 on a pad portion 16.

A signal relay portion M is provided with a light emitting circuit 34, a light receiving circuit 35 and a signal regeneration circuit 36. Further, a waveform shaping circuit 37, a receiving side remote control IC 38, an output interface 39 and a power circuit 40 are disposed on a column portion 18. Moreover, a power relay portion 41 is disposed between the pad portion 16 and the column portion 18.

Through the operation of the switch 30 on the pad portion 16, the emitting side remote control IC 31 is activated being power supplied by the power circuit 33, thereby a plurality of electric signals are serialized.

Next, the series signal is amplified in the driver circuit 32 and a light signal is emitted from the light emitting circuit 34 based on said series signal. On the other hand, said light signal is received in the light receiving circuit 35, said light signal being converted again in a signal regeneration circuit 36 to an electric signal. And, said electric signal is shaped to the former pulse waveform in a waveform shaping circuit 37. Subsequently, said pulse waveform is transmitted to an output interface 39 through the intermediary of a receiving side remote control IC 38 to drive electric appliances and actuators.

These communication systems, however, require the multiplex communication circuits, causing the systems to be complicated and the costs to be high.

SUMMARY OF THE INVENTION

It is an object of the present invention to provide a steering wheel of a simple circuit component and a low cost.

It is another object of the present invention to provide a steering wheel which requires small space and simple assemblage in power supply from the column side to the pad side.

In order to achieve the foregoing objects, the present invention comprises a steering shaft, a boss plate fixed on the tip of the steering shaft, a ring portion mounted to said boss plate, a light emitting means and a light receiving means provided with said boss plate therebetween to perform light communication, said light emitting means comprising a plurality of emitting units while said light receiving means comprising a plurality of receiving units corresponding to the emitting units of the emitting means so as to transmit and receive signals with each other, thereby constituting a communication unit with a pair of emitting and receiving units, and a plurality of through holes formed on said boss plate in correspondence to said light emitting and light receiving means, which are more than the communication units described above and enable all the light signals of all the units for light communication to pass through.

Other objects of the present invention will become apparent with an understanding of the embodiments described later, and as clarified in appended claims. Further, many advantages not mentioned in this specification, will become obvious to one skilled in the art upon application of the present invention.

DETAILED DESCRIPTION OF THE PREFERRED EMBODIMENTS

An embodiment of the present invention which is concretized in a steering wheel of a pad portion of an unrotational type will be described hereunder with reference to FIG. 1 to FIG. 22.

First Embodiment

Figure 1:
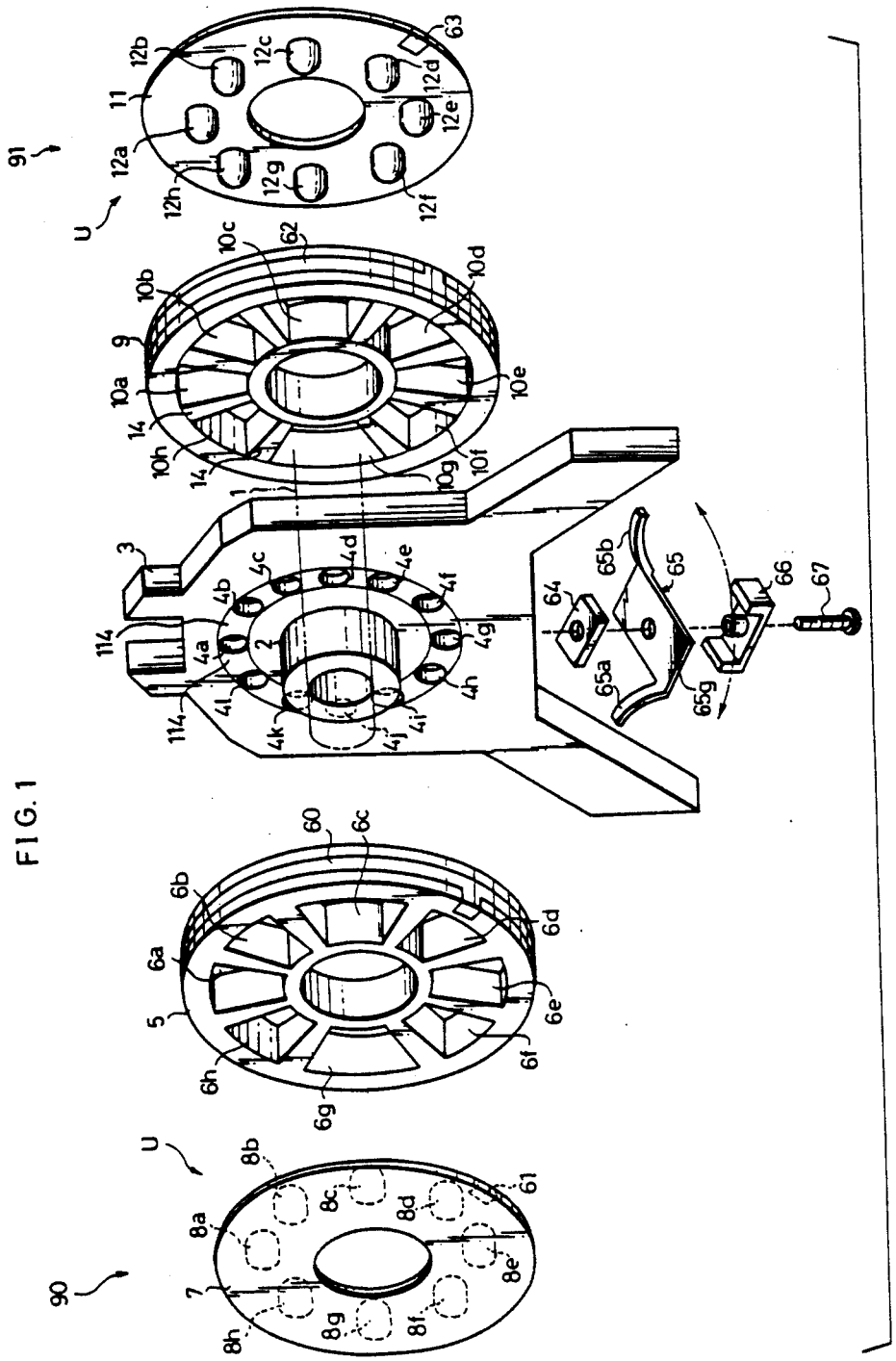
FIG. 1 is an exploded perspective view showing a communication system and a power relay system of a first embodiment.

As shown in FIG. 1, a boss plate 3 is fixed by welding on a boss portion 2 secured to a steering shaft 1. On said boss plate 3, twelve through holes 4a to 4l are formed with equal spaces on the same circumference all around the boss portion 2. On the upper surface (left side of FIG. 1) of said boss plate 3, a first reflector 5 on the pad side is disposed, whereon eight compartments 6a to 6h of a trapezoid-shaped cross section are formed.

Moreover, a third slip ring 60 on the pad side is provided for the relay of power on the outer circumferential surface of said first reflector 5. As a means of providing said third slip ring, there is a method of painting by a dispenser or plating by dual formation or others. A method of plating by dual formation is to plate after the portion to be plated is formed by ABS resin of a plating grade while the portion not to be plated is made of the material inappropriate for plating such as polycarbonate and others.

On the upper surface of the first reflector 5, a first base plate 7 is placed. On said first base plate 7, eight pieces of light emitting units 8a to 8h using light emitting diodes (LED), photo diodes or others are disposed as a light emitting means 90. On a part of the outer circumference of said first base plate 7, a connector 61 is provided to electrically connect with said third slip ring 60. Said connector 61 is formed by soldering of electrically conductive metal or pressure welding.

On the other hand, a second reflector 9 on the column side is provided on the under surfaces (right side in FIG. 1) of the boss plate 3. On said second reflector 9, eight compartments 10a to 10h are formed as the same with said first reflector 5. On the outer circumferential surface of said second reflector 9, a fourth slip ring 60 on the column side is provided for the relay of power as the same with said third slip ring 60. Said fourth slip ring 62 is formed as the same with the third slip ring 62.

Moreover, a second base plate 11 is placed on the under surface of the second reflector 9, whereon eight pieces of light receiving units 12a to 12h are provided as a light receiving means 91. On a part of the outer circumference of the second base plate 11, a connector 63 is provided to electrically connect with the third slip ring 60. As described in the above, the member of through holes 4a to 4l (12 pieces) on the boss plate 3 is more than the number of the communication units U constituting pairs (8 pairs) of light emitting units 8a to 8h and light receiving unites 12a to 12h corresponding to each other.

Figure 3:
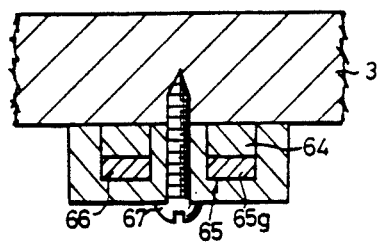
FIG. 3 is a cross-sectional view showing a mounting structure of a relay member.
Figure 4:
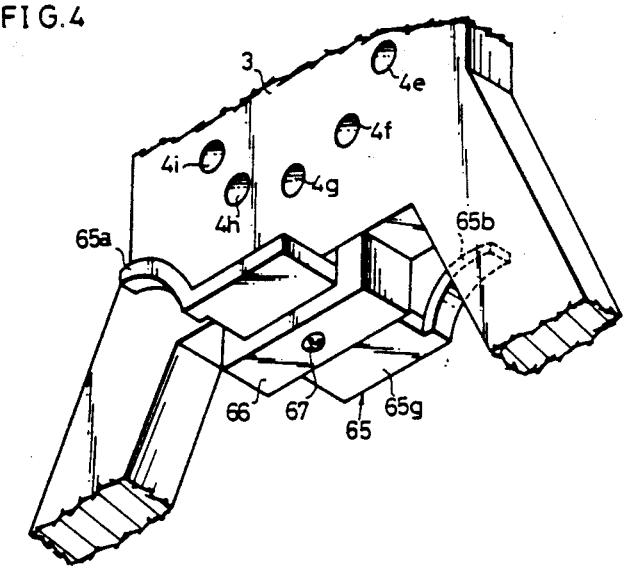
FIG. 4 is a perspective view of the same.
Figure 5:
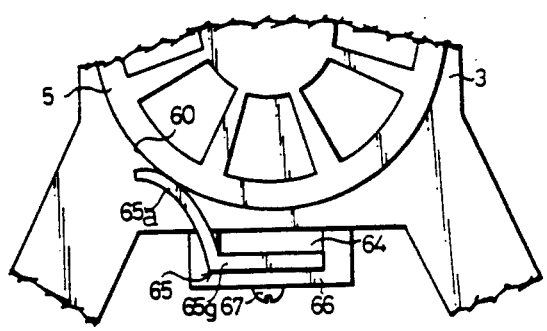
FIG. 5 is a front view of the same.

Outside of the boss plate 3 (under side in FIG. 1), a power relay member 65, a tip of which is bent, is secured to the boss plate 3 from the upper portion of a fixture plate 66 by a screw 67 with an insulating plate 64 in between. The structure of this portion is further described in detail. As shown in FIGS. 3 and 4, an insulating plate 64 is provided on the under portion of the boss plate 3. On the under portion of said insulating plate 64, a power relay member 65 of electrically conductive metal such as phosphor bronze or others and made by punching a plate metal is provided. These insulating plates 64 and relay members 65 are fixed with a fixture plate 66 of a U-shaped cross section by means of a screw 67. Moreover, as shown in FIGS. 4 and 5, one of the bent contact portions 65a of the relay member 65 is in sliding contact with the third slip ring 60. The other one of the bent contact portions 65b is in sliding contact with the fourth slip ring 62 to relay the power.

Figure 2:
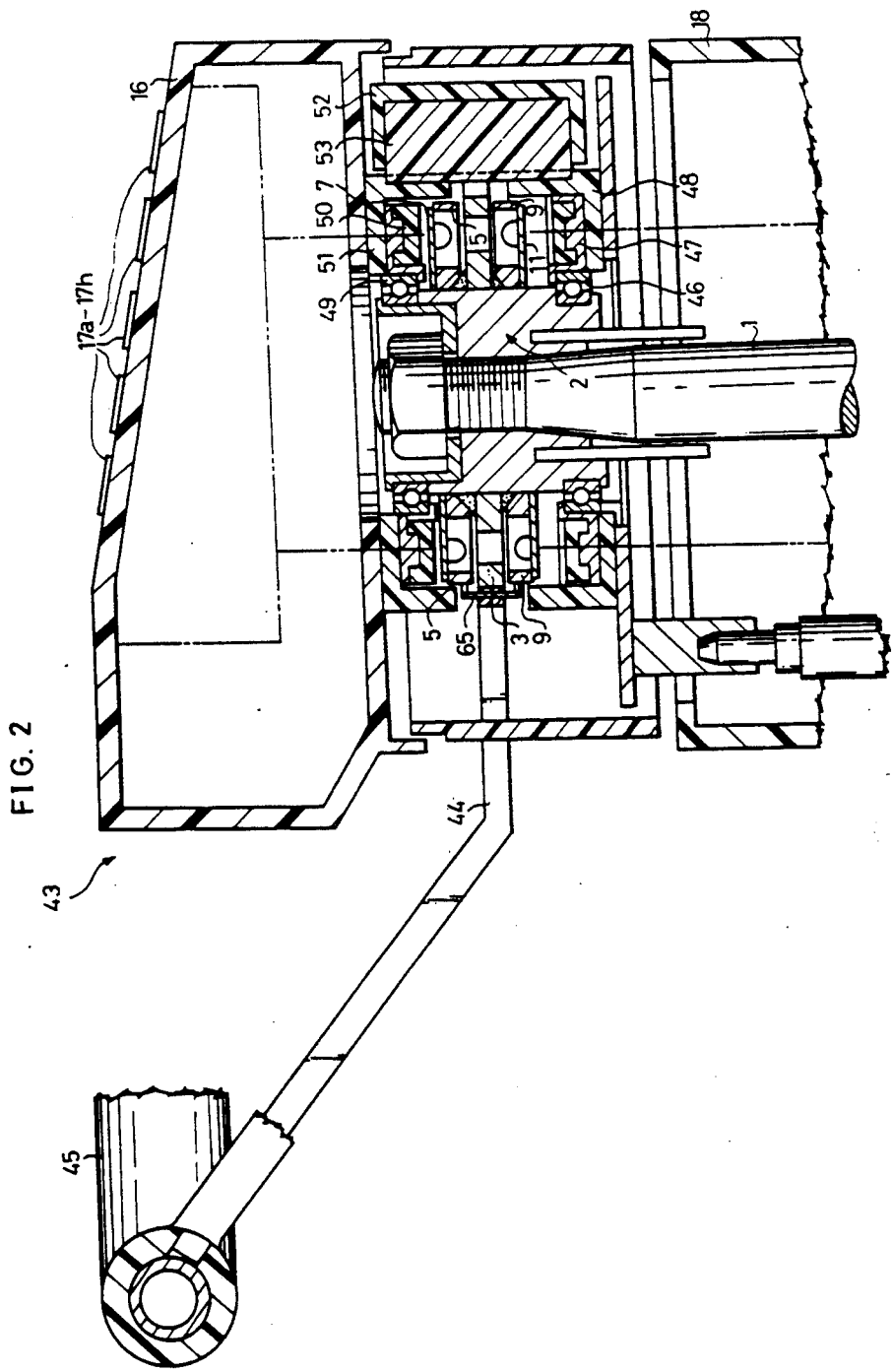
FIG. 2 is a cross-sectional view of a steering wheel of a first embodiment.

Now, an overall structure of a steering wheel 43 of the pad portion of an unrotational type in the present embodiment is described hereunder. As shown in FIG. 2, a ring portion 45 is supported by a spoke portion 44 extending from the outer circumferential portion of the boss plate 3.

On the under portion of said boss portion 2, a bearing unit 47 of a flange shape is provided through a bearing 46. On the undersurface of said bearing unit 47, a sun gear 48 of the column side is provided.

On the upper portion of said boss portion 2, a bearing unit 50 of a flange shape is provided through a bearing 49. On the upper surface of said bearing unit 50, a sun gear 51 of the pad side is provided, whereon said pad portion 16 is fixed. On said pad portion 16, eight pieces of switches 17a to 17h are provided.

On the side portion of said boss plate 3, a planetary gear unit 52 is provided, whereon a planetary gear 53 is provided. When said ring portion 45 is rotated, the planetary gear 53 rotates and revolves around the two sun gears 48, 51 so as to maintain the pad portion 16 to be unrotational.

Figure 6:
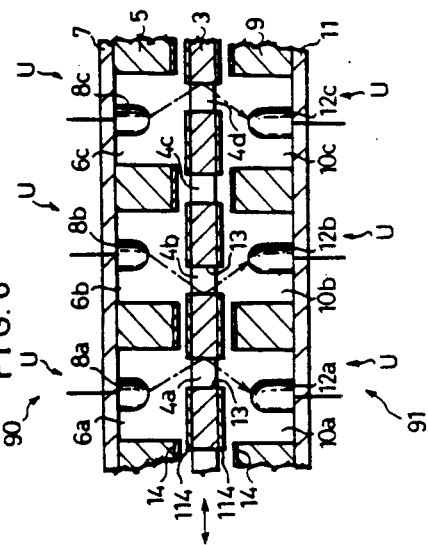
FIG. 6 is a cross-sectional view showing a communication system of a first embodiment.

In the communication system according to the present embodiment, as shown in FIG. 6, each light emitting unit 8a to 8h which is mounted on the under surface of the first base plate 7 is disposed at the central portion of each compartment 6a to 6h formed on the first reflector 5 on the upper surface side of the boss plate 3. On the other hand, on the under surface side with the boss plate 3 therebetween, each light receiving unit 12a to 12h which is mounted on the upper surface of the second base plate 11 is provided in opposition to said light emitting units 8a to 8h and at the central portion of each compartment 10a to 10h of the second reflector 9.

The inner surfaces of the through holes 4a to 4l on the boss plate 3 are made light reflecting surfaces 13. The end surfaces of the first reflector 5 and the second reflector 9 on the side of the boss plate 3 are made light intercepting surface 14 while both the upper and under surface of the boss plate 3 are made light intercepting surfaces 114. Moreover, the length of the light intercepting surfaces 14 which are provided on the end surfaces of the first reflector 5 and the second reflector 9 at the side of the boss plate 3 is preferred to the longer than the length of the compartment 6a to 6h of the boss plate 3. Therefore, light signals are reliably transmitted or received between the light emitting units 8a to 8h and the light receiving units 12a to 12h which are corresponding to each other between the upper and the under.

On one side of the boss plate 3 (left side in FIG. 2), a power relay member 65 is attached. The tip of said power relay member 65 is attached. The tip of said power relay member 65 is adapted to be in sliding contact with the third slip ring 60 provided on the outer circumferential portion of the first reflector 5 and the fourth slip ring 62 provided on the outer circumferential portion of the second reflector 9.

With regard to the steering wheel 43 of the pad portion of an unrotational type being provided with the communication system and the power supply system by the light signal constituted as this, the operation is explained and its effects are mentioned.

When the ring portion 45 of the steering wheel 43 is not rotated, one of the switches 17a on the pad portion 16 is turned on, thereby a light emitting unit 8a emits light. As shown in FIG. 6, a light signal from a light emitting unit 8a reaches a light receiving unit 12a through a compartment 6a of the first reflector 5, a through hole 4a of the boss plate 3, and a compartment 10a of the second reflector 9 where it is received. And said light signal is converted to an electric signal. Said electric signal drives each actuator through a power amplifying means such as a buffer.

Since, as described above, the member of the through holes 4a to 4l of the boss plate 3 is more than the member of the communication units U constituted pairs of the light emitting units 8a to 8h and the light receiving units 12a to 12h corresponding to each other and the inner surfaces of said through holes 4a to 4l are made light reflecting surfaces 13, when the ring portion 45 of the steering wheels 43 is rotated, the boss plate 3 rotates with the rotation of the ring portion 45 and the through hole 4a moves. Even if the light from the light emitting unit 8a doesn't come to enter said through hole 4a, the through holes 4b, 4c move progressively, thereby the light from the light emitting unite 8a can be transmitted to reach the light receiving unit 12a.

Accordingly, the light from the light emitting unit 8a is transmitted through one or two out of the through holes 4a to 4l of the boss plate 3 to reach the light receiving unit 12a. In this way, all of the communication units U comprising the light emitting units 8a to 8h and the light receiving units 12a to 12h corresponding to each other perform the light communication.

Figure 10:
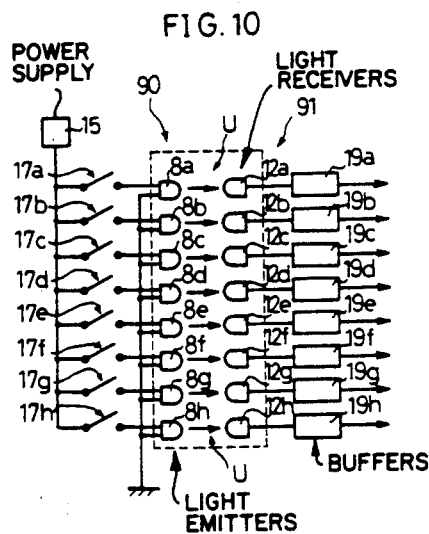
FIG. 10 is a circuit diagram showing an equivalent circuit according to a first embodiment.

The equivalent circuit of such a communication system by the light signal as this is shown in FIG. 10. Namely, a power supply portion 15 is connected to the eight switches 17a to 17h disposed on the pad portion 16. Each of said switches 17a to 17h is connected to each of the light emitting units 8a to 8h respectively.

And, the light signals from the light emitting units 8a to 8h are transmitted to the light receiving units 12a to 12h. The signals from said light receiving units 12a to 12h are transmitted to each actuator through each buffer 19a to 19h on the column portion 18 to drive them.

The power supply to the pad portion 16 is performed smoothly from the power source on a column portion 18 through the fourth slip ring 62, the contact portion 65b of the power relay member 65, the power relay member 65, the contact portion 65a of said power relay member 65 and the third slip ring 60. The power supply to said light emitting units 8a to 8h is performed through the connector 61 and the third slip ring 60 while the power supply to the light receiving units 12a to 12h is performed through a connector 63 and the fourth slip ring 62.

Thus, an air conditioner or an audio equipment, for example, is reliably operated by turning on the switches 17a to 17h disposed on the pad portion 16.

According to the present embodiment, as mentioned above, the communication system of the steering wheel 43 does not require the multiplex communication circuits and the light communication is performed at each communication unit U comprising a pair of the light emitting unit 8a to 8h and the light receiving unit 12a to 12h corresponding to each other. Therefore, the structure of the communication system is simplified and the cost is reduced.

Further, the circuit in the present communication system is simple and the receiving sensitivity is stabilized, therefore the maintainance being easy. According to the power supply system in this embodiment, the power supply is conducted with better efficiency and smaller space.

Second Embodiment

Figure 7:
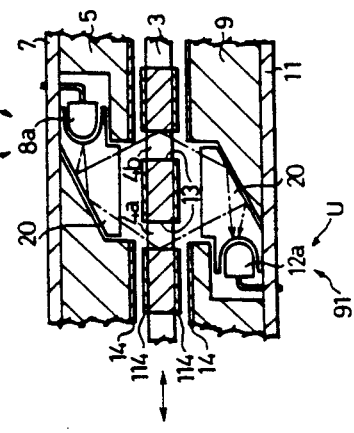
FIG. 7 is a cross-sectional view showing a communication system of a second embodiment.

In the communication system according to the present embodiment, as shown in FIG. 7, the light emitting units 8a to 8h and the light receiving units 12a to 12h are disposed parallel with the boss plate 3. Further, lens units 20 of a substantially triangle-shaped cross section are disposed in the compartments 6a to 6h of the first reflector 5 and the compartments 10a to 10h of the second reflector 9 so as to reflect the light signals.

The other construction of the communication system is the same as the first embodiment described above. Thus being constructed, the light signal emitted from the light emitting unit 8a to 8h is reflected by the lens unit 20 to reach the wide area. Accordingly, the light signal passes through either one of the through holes 4a to 4l without regarding to the position of the through holes 4a to 4l of the boss plate 3 and after being reflected by the lens unit 20 of the second reflector 9, the light signal is received by the light receiving unit 12a to 12h. In this way, the light receiving sensitivity in the communication system of the steering wheel according to the present embodiment is very stabilized.

Third Embodiment

Figure 8:
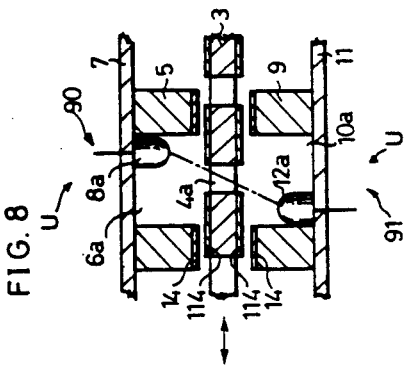
FIG. 8 is a cross-sectional view showing a communication system of a third embodiment.

In the communication system of the present embodiment, as shown in FIG. 8, the position of the light emitting units 8a to 8h is changed to the end portion (right end in FIG. 8) of the compartment 6a to 6h of the first reflection 5 different from the case of the first embodiment.

On the other hand, the position of the light receiving units 12a to 12h is the end portion opposite (left end in FIG. 8) to said light emitting unit 8a to 8h in the compartment 10a to 10h of the second reflector 9. Being constructed like this, the light signal from the light emitting unit 8a to 8h is received by the light receiving unit 12a to 12h passing through one or two of the through holes 4a to 4l without regarding the position of the through holes 4a to 4l of the boss plate 3.

Accordingly, the communication system of the steering wheel in the present embodiment is also efficient in the receiving sensitivity as the same with the second embodiment.

Fourth Embodiment

Figure 9:
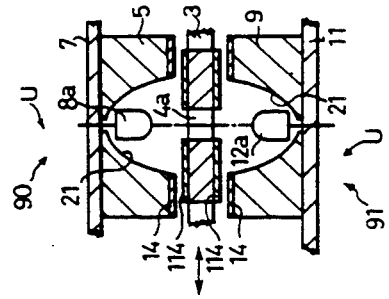
FIG. 9 is a cross-sectional view showing a fourth embodiment.

In the communication system of the present embodiment, as shown in FIG. 9, the inside of the first reflector 5 is formed like a hanging bell, the inner surface of which is made a light reflecting portion 21 by means of alminum deposition or other method.

The inside of the other reflector, namely the second reflector 9, is also formed like a hanging bell and the inner surface is made a light reflecting portion 21. The constitution of other communication system is the same with the first embodiment.

Being constituted in this way, the communication system of the steering wheel in this embodiment is also good in the receiving sensitivity as the same with the second and the third embodiments.

Fifth Embodiment

Figure 11:
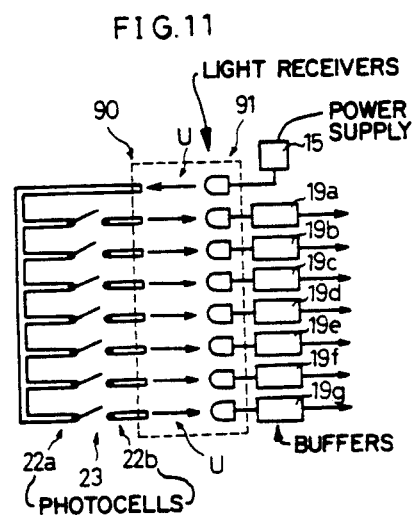
FIG. 11 is a circuit diagram showing a fifth embodiment.

In the present embodiment, as shown in FIG. 11, wiring photocells 22a, 22b such as optical fibers and light switches 23 is provided on the pad portion 16.

One communication unit U of the light pairs of communication units U comprising the light emitting units 8a to 8h and the light receiving units 12a to 12h is made to transmit from the column side and receive at the pad side.

Said communication unit U is connected to the power supply portion 15. Through said one communication unit U, the light signal is transmitted from the column side to the pad side.

Accordingly, the status of various equipments in operation can be reliably displayed on the pad portion 16 by means of operating the switches at the column portion 18 side. Said light switches 23 are constituted as shown in FIGS. 12 and 13.

Figure 12:
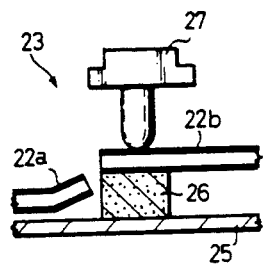
FIGS. 12 and 13 are cross-sectional views showing light switches.
Figure 13:
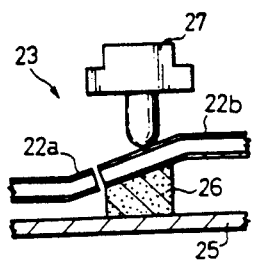

As shown in FIG. 12, a resilient member 26 such as rubber or others is secured on a base plate 25, on the upper surface of which a photocell 22b is disposed. On the upper portion of said photocell 22b, a push portion 27 is placed. At the side of the elastic member 26, a optical fiber 22a is disposed with the tip slanting upward. When the press portion 27 is pressed, the elastic member 26 is compressed, thereby the optical fibers 22b and 22a being communicated.

In the present embodiment, not only the above described operation and effected but also the same operation and effect in the foregoing embodiments are exhibited.

Sixth Embodiment

The power relay member 65 of the power relay structure in the first embodiment is constructed as follows.

Figure 14:
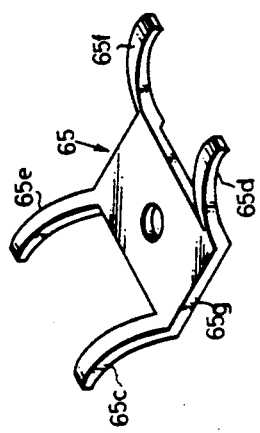
FIG. 14 is a perspective view showing a relay member of a sixth embodiment.

As shown in FIG. 14, both the end portions are extended intersecting the lengthwise direction and to the either side with contact portions 65c, 65d and 65e, 65f being bent upward.

Figure 15:
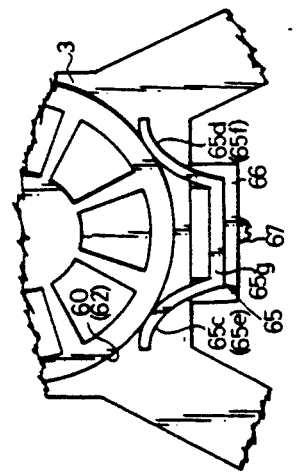
FIG. 15 is a front view showing a mounting structure of a relay member.

Being constructed in this way, as shown in FIG. 15, the contact portions 65c, 65d are in sliding contact with the third slip ring 60 while the contact portions 65e, 65f are in sliding ring 60 while the contact portions 65e, 65f are in sliding contact with the fourth slip ring 62. Accordingly, the contact positions of the power relay member 65 with the third slip ring 60 or the fourth slip ring 62 are two positions respectively, thereby reducing the time and the number of momentary disconnection.

Seventh Embodiment

The mounting structure of the power relay member 65 in the first embodiment is changed as follows.

Figure 16:
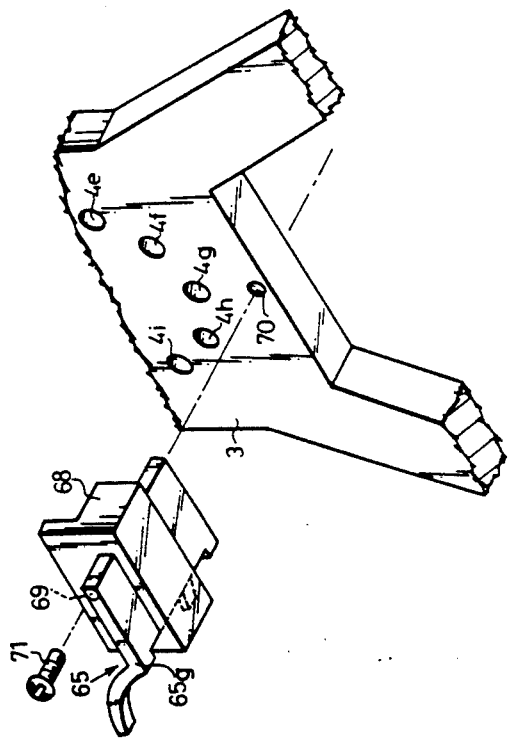
FIG. 16 is a perspective view showing a mounting structure of a relay member according to a seventh embodiment.

As shown in FIG. 16, a mounting member 68 of L-shaped cross section having a mounting hole 69 on the upper portion thereof, is formed integrally with a power relay member 65 of similar construction to the power relay member 65 in the first embodiment. On the boss plate 3, a through hole 70 is formed on the further outer circumferential portion in addition to the through holes 4a to 4l. A bolt 71 is inserted into the mounting hole 69 and then into the through hole 70 of the boss plate 3 so as to mount the power relay member 65 on the boss plate 3.

According to the present embodiment, the power relay member 65 formed integrally with the mounting member 68 is mounted on the boss plate 3, thereby the assembling of the power relay member 65 can be simplified.

Eighth Embodiment

The mounting member 68 in the seventh embodiment is constructed as follows.

Figure 17:
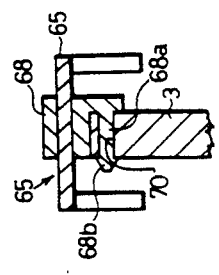
FIG. 17 is a cross-sectional view showing a mounting structure of a relay member according to an eighth embodiment.

As shown in FIG. 17, a part as an inserted portion 68a of the mounting member 68 has a length equal to the through hole 70 of the boss plate 3.

And a projection 68b of the tip portion is formed integrally with the mounting member extending further from the through hole 70 so as to be engageable with the boss plate 3.

According to the present embodiment, the assembling process of the power relay member 65 can be further simplified. And said mounting member 68 can also be mounted on the boss plate by means of thermal caulking.

Ninth Embodiment

In the present embodiment, the power supply system is constituted as follows.

Figure 18:
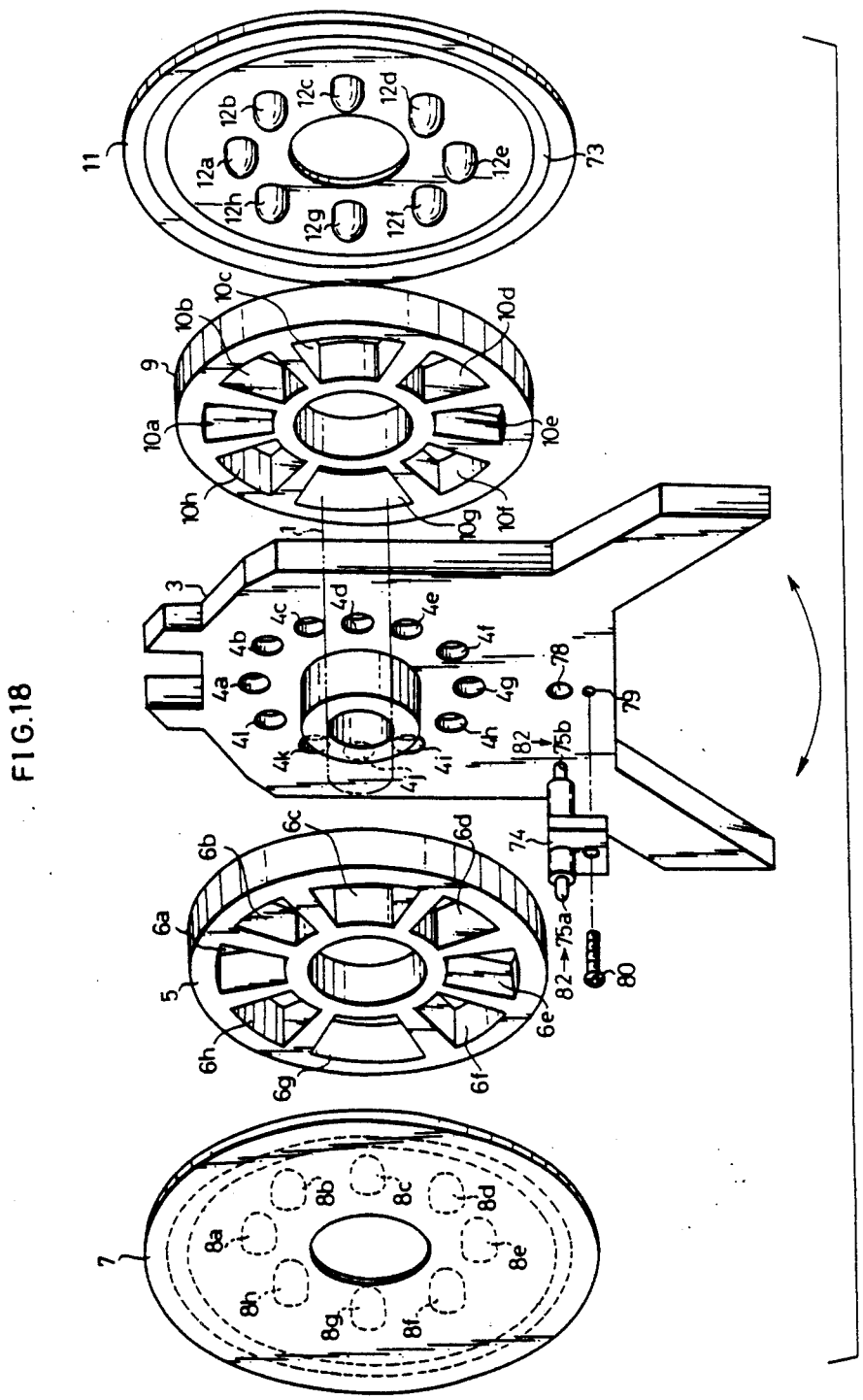
FIG. 18 is an exploded perspective view of a steering wheel showing a power supply structure according to a ninth embodiment.

As shown in FIG. 18, a first slip ring 72 is provided on the outer circumferential portion of the light emitting unites 8a to 8h disposed on the surface of the first base plate 7 facing the boss plate 3. A second slip ring 73 is also provided on the surface of a second boss plate 11 facing the boss plate 3 and on the outer circumferential portion of the light receiving unites 12a to 12h.

Figure 19:
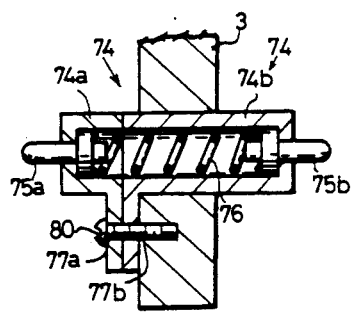
FIG. 19 is a cross-sectional view showing an assembling structure of a contact pin.

Moreover, contact pins to be used are constructed as follows. As shown in FIG. 19, a first contact pin 75a and a second contact pin 75b which are used as relay members, are disposed respectively in the upper and the lower portions of a contact pin case 74 formed with a first contact pin case 74a (left side in FIG. 19) and a second contact pin case 74b.

These contact pins 75a and 75b are biased by a spring 76 disposed between them in the respectively opposite direction, namely the direction which the spring contacts said first contact pin 75a or said second contact pin 75b. On one side of the coupling portion of the first contact pin case 74a and the second contact pin case 74b, through holes 77a and 77b are formed respectively at the same position.

Further, as shown in FIG. 18, a through hole 78 is formed on the boss plate 3 at the outer circumferential portion of the through holes 4a to 4l so as to insert the second contact pin 75b. On the outer circumferential portion of said through hole 78, a hole 79 is formed to fix both the contact pin cases 74a and 74b. The second contact pin 75b is inserted into the through hole 78 together with the second contact pin case 74b. Next, a bolt 80 is inserted through both the through holes 77a and 77b of the contact pin cases 74a, 74b into the hole 79, thereby both the contact pins 75a and 75b being secured to the boss plate 3.

According to the present embodiment, both the slip rings 72 and 73 can be produced in the etching process of the printed boards in making the base plate 7 and 11, therefore the power supply structure being formed with ease and with low cost.

Tenth Embodiment

In the present embodiment, the contact pin cases 74a, 74b of the ninth embodiment are constructed as follows.

Figure 20:
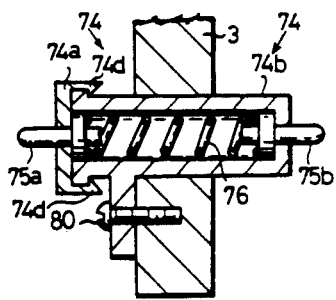
FIG. 20 is a cross-sectional view showing an assembling structure of a contact pin according to a tenth embodiment.

As shown in FIG. 20, the upper portion of the second pin case 74b is made open. The first contact pin case 74a is made to have a substantially U-shaped cross section and provided with a projection 74d to form an undercut with respect to the upper portion of the second contact pin case 74b.

According to the present embodiment, the first contact pin case 74a can be easily assembled through one touch action.

Eleventh Embodiment

In the present embodiment, the mounting of the second contact pin case 74b to the boss plate 3 is constituted instead of the foregoing tenth embodiment and as follows.

Figure 21:
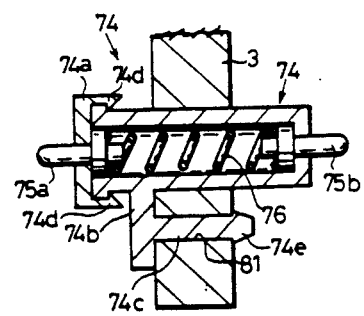
FIG. 21 is a cross-sectional view showing an assembling structure of a contact pin according to an eleventh embodiment.

As shown in FIG. 21, the hole 79 on the boss plate 3 is made a through hole 81. The second contact pin case 74b is formed integrally to project through said through hole 81 and engage with the boss plate 3 by forming a projection 74e to form an under cut with respect to the boss plate 3.

According to the present embodiment, the mounting of the second contact pin case 74b to the boss plate 3 can be performed through one touch action, thereby making the assembly much easier.

Twelfth Embodiment

In the present embodiment, the contact plate and the contact pin case of the foregoing ninth to eleventh embodiments are constituted as follows.

Figure 22:
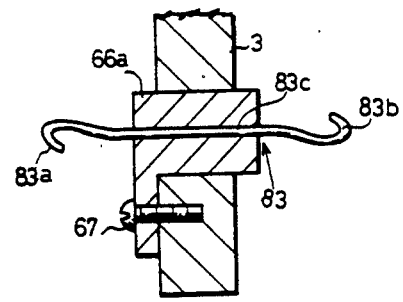
FIG. 22 is a cross-sectional view showing an assembling structure of a contact pin according to a twelfth embodiment.
Figure 23:
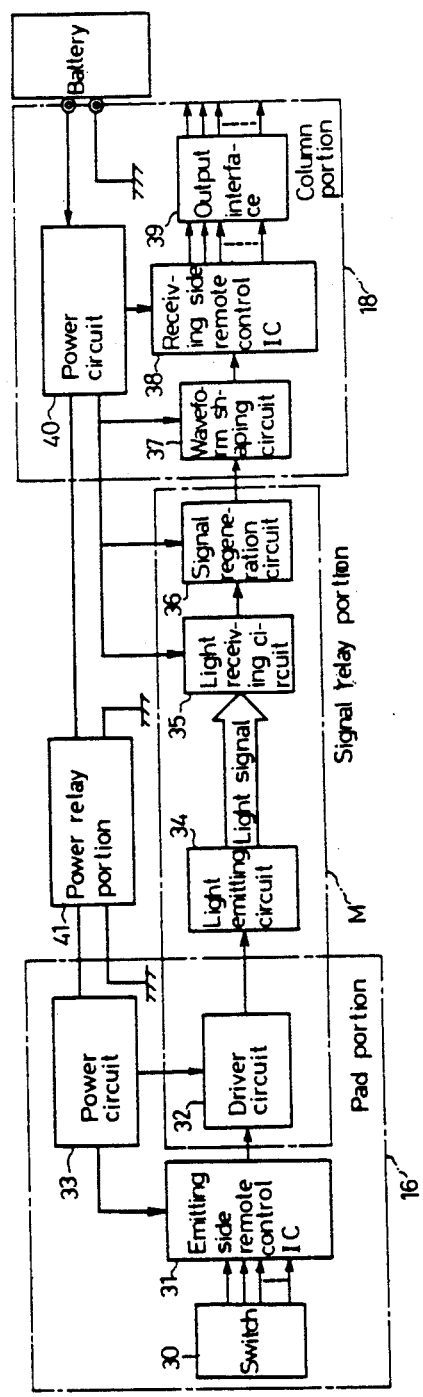
FIG. 23 is a circuit diagram showing a conventional communication system.

As shown in FIG. 22, a relay member 83 comprises contact portions 83a, 83b at the opposite ends which always contact sliding said slip rings 72, 73, and a fitting in portion 83c between said contact portions. Said fitting in portion 83c is formed integrally in a fixture member 66a of a L-shaped cross section.

Said fixture member 66a is secured by a screw 67 to the boss plate 3.

According to the present embodiment, the assemblage becomes further easy because of no usage of both the contact pins 75a, 75b, the spring 76 and other.

Moreover, the mounting of the fixture member 66a to the boss plate 3 can be performed by the engagement structure using an undercut or the thermal caulking or others.

Since it is apparent that a wide variety of different embodiments may be arranged without departing from the spirit and scope of the present invention, it is to be understood that the invention is not limited to the specific embodiments thereof except as defined in the appended claims.

What is claimed is:

1. A steering wheel comprising:
a steering shaft;
a boss plate secured to the tip portion of said steering shaft;
a ring portion mounted to said boss plate;
light emitting means and light receiving means disposed oppositely to each other with said boss plate therebetween so as to perform light communication, said light emitting means having a plurality of light emitting units while said light receiving means having a plurality of light receiving units corresponding to said light emitting units of said light emitting means so as to transmit and receive light relative to each other, a pair of said light emitting units and said light receiving units transmitting and receiving the light relative to each other and constituting a communication unit; and
a plurality of through holes formed on said boss plate in correspondence to said light emitting means and said light receiving means, a number of said through holes being more than a number of said communication units for light communication, said through holes permitting to pass therethrough light signals for the light communication of all said units.

2. A steering wheel according to claim 1, wherein said through holes are formed at equal intervals on a circle coaxial with a rotation center of said steering shaft while said light emitting units and said light receiving units are disposed at equal intervals on said circle defined by said through holes.

3. A steering wheel according to claim 2, wherein said light emitting unit and said light receiving unit are positioned so as to shift each other in a direction of said circle.

4. A steering wheel according to claim 2, wherein a first reflector is provided between said boss plate and said light emitting means and a second reflector is provided between said boss plate and said light receiving means, said first reflector allowing the light signal emitted from said light emitting unit to reflect to a side of said light receiving unit as well as preventing the light signal emitted from each said light emitting unit from crossing each other, while said second reflector allows the light signal to reflect to a side of said light receiving unit as well as prevents the light signal transmitted to each said light receiving unit from crossing each other.

5. A steering wheel according to claim 4, wherein said first reflector is provided with a plurality of compartments so as to accommodate each said light emitting unit of said light emitting means and to partition the light signals emitted therefrom, while said second reflector is provided with compartments so as to accommodate each said light receiving unit of said light receiving means and to receive the light signals emitted from said light emitting unit without the light signals crossing each other.

6. A steering wheel according to claim 4, wherein a plurality of light intercepting surfaces are provided between two adjacent compartments on said first reflector and between two adjacent compartments on said second reflector so as to prevent the light signals emitting from said adjacent light emitting units from crossing each other.

7. A steering wheel according to claim 6, wherein all said through holes have equal sizes and a length of said light intercepting surface between said compartments is longer than the size of said through hole.

8. A steering wheel according to claim 4, wherein said first reflector and said second reflector have a plurality of light reflecting portions so as to reflect the light signals from the side of said light emitting units to the side of said light receiving units.

9. A steering wheel according to claim 2, wherein light intercepting surfaces are provided, on both surfaces of the side of said light emitting means and the side of said light receiving means, between adjacent said through holes along said circle defined by said through holes.

10. A steering wheel according to claim 2, wherein said light emitting means and said light receiving means have a plurality of lens units in correspondence to said light emitting units and said light receiving units so as to conduct the light signals emitted from each said light emitting unit to said light receiving units.

11. A steering wheel according to claim 2, wherein said light emitting unit and said light receiving unit are positioned corresponding to each other in a direction of said circle.

12. A steering wheel according to claim 1, wherein each said through hole on said boss plate has a light reflecting surface on its inner surface so as to reflect the light signal from a side of said light emitting unit to a side of said light receiving unit.

13. A steering wheel comprising:
a steering shaft;
a boss plate fixed on a tip portion of said steering shaft;
a ring portion mounted to said boss plate;
a pair of base plates provided oppositely to each other with said boss plate therebetween;
a light emitting means and a light receiving means each provided on each of said base plates for light communication, said light emitting means comprising a plurality of emitting units, said light receiving means comprising a plurality of receiving units corresponding to said emitting units of said emitting means so as to transmit and receive light signals relative to each other, a pair of said emitting unit and said receiving unit constituting a communication unit;
a first reflector disposed between said first base plate and said boss plate;
a second reflector disposed between said second base plate and said boss plate;
a plurality of through holes formed on said boss plate in correspondence to said light emitting means and said light receiving means, a number of said through holes being more than that of the communication units for the light communication, and said through holes permitting all the light signals of all said units for the light communication to pass therethrough;
a pair of slip rings made of electrically conductive metal and disposed on either one of an outer circumferential portion of said first reflector and said second reflector and both said base plates, and
a power relay member fixed to said boss plate and sliding on said slip rings to relay power.

14. A steering wheel according to claim 13, wherein said power relay member has a relay portion secured to said boss plate and a pair of contact portions integrally formed at an end portion of said relay portion so as to slidingly contact with said pair of slip rings.

15. A steering wheel according to claim 14, wherein said power relay member has a mounting member formed integrally on said relay portion and having a mounting hole for mounting said power relay member to said boss plate.

16. A steering wheel according to claim 15, wherein said mounting member includes an inserted portion passing through said through hole of said boss plate, and having on a tip portion thereof a projection projecting from said through holes and engageable with said boss plate.

17. A steering wheel according to claim 13, wherein said power relay member has a relay portion secured to said boss plate and contact portions integrally provided on four corners of said relay portion.

18. A steering wheel according to claim 13, wherein said slip rings comprise first and second slip rings, said first slip ring is formed on a surface of said first base plate facing said boss plate while said second slip ring is formed on a surface of said second base plate facing said boss plate, said relay member comprises a first contact pin which always contacts with said first slip ring, a second contact pin which always contacts with said second slip ring, a spring disposed between both said contact pins and biasing them in such a direction as to contact with said first slip ring and said second slip ring, and a contact pin case accommodating both said contact pins and said spring therein.

19. A steering wheel according to claim 18, wherein said contact pin case comprises a first contact pin case, a second contact pin case, and a projection formed at a tip portion of said first contact pin case and engageable with said second contact pin case.

20. A steering wheel according to claim 19, wherein said second contact pin case includes on a portion thereof an inserted portion passing through said through hole, and having at a tip portion thereof a projection projecting from said through holes and engageable with said boss plate.

21. A steering wheel according to claim 13, wherein said relay member comprises an inserted portion and a pair of contact portions slidingly contacting with both said slip rings and said inserted portion is mounted in a fixture member secured to said boss plate.

* * * * *